United States Patent
Tsujimura et al.

(10) Patent No.: US 6,815,478 B2
(45) Date of Patent: Nov. 9, 2004

(54) CHLORINE-CONTAINING POLYMER VULCANIZING COMPOSITION

(75) Inventors: Kazuya Tsujimura, Hyogo (JP); Kozo Misumi, Hyogo (JP); Toshiyuki Funayama, Hyogo (JP); Kazunori Yokoyama, Hyogo (JP)

(73) Assignee: Daiso Co., Ltd., Osaka (JP)

( * ) Notice: Subject to any disclaimer, the term of this patent is extended or adjusted under 35 U.S.C. 154(b) by 0 days.

(21) Appl. No.: 10/298,009

(22) Filed: Nov. 18, 2002

(65) Prior Publication Data

US 2003/0153652 A1 Aug. 14, 2003

Related U.S. Application Data

(63) Continuation of application No. 09/329,334, filed on Jun. 10, 1999, now Pat. No. 6,500,884.

(30) Foreign Application Priority Data

Jun. 12, 1998 (JP) .......................................... 10-164989

(51) Int. Cl.⁷ ................................................ C08K 5/46
(52) U.S. Cl. ........................ 524/280; 524/282; 524/450
(58) Field of Search ........................ 524/83, 100, 280, 524/282, 450, 567

(56) References Cited

U.S. PATENT DOCUMENTS

| | | | |
|---|---|---|---|
| 4,395,349 A | 7/1983 | Kinoshita | .................... 252/182 |
| 5,580,919 A | 12/1996 | Agostini et al. | ............. 524/430 |
| 5,645,757 A | 7/1997 | Class | ..................... 252/182.13 |
| 5,853,849 A | 12/1998 | Nishio et al. | ................ 428/143 |
| 5,993,952 A | 11/1999 | Cox et al. | ................. 428/305.5 |

FOREIGN PATENT DOCUMENTS

| | | |
|---|---|---|
| JP | 58-18939 | 4/1983 |
| JP | 60-233138 | 11/1985 |
| JP | 7-207088 | 8/1995 |
| JP | 9-176433 | 7/1997 |

*Primary Examiner*—Peter D. Mulcahy
(74) *Attorney, Agent, or Firm*—Armstrong, Kratz, Quintos, Hanson & Brooks, LLP

(57) ABSTRACT

The present invention provides a chlorine-containing polymer vulcanizing composition with improved preservation stability. The present invention is a chlorine-containing polymer vulcanizing composition obtained by blending (a) a zeolite compound, (b) a vulcanizing agent, and (c) an optional organic vulcanization accelerator. The zeolite compound can be natural zeolite, an A-type, X-type, or Y-type synthetic zeolite, a sodalite, natural or synthetic mordenite, ZSM-5, or a metal substitution product thereof. The zeolite compound is preferably an activated zeolite compound. With respect to 100 parts by weight of chlorinated polyethylene, (a) preferably 0.5 to 30 parts by weight, more preferably 5 to 25 parts by weight, of the zeolite compound, (b) preferably 0.1 to 5 parts by weight, more preferably 0.5 to 3 parts by weight, of the vulcanizing agent, and (c) preferably 0.5 to 3 mol, more preferably 0.7 to 1.5 mol, of the vulcanization accelerator with respect to 1 mol of (b) the vulcanizing agent are blended.

14 Claims, No Drawings

CHLORINE-CONTAINING POLYMER VULCANIZING COMPOSITION

This application is a Continuation of prior application Ser. No. 09/329,334 filed Jun. 10, 1999 now U.S. Pat. No. 6,500,884 which is hereby incorporated by reference.

BACKGROUND OF THE INVENTION

1. Field of the Invention

The present invention relates to a chlorine-containing polymer vulcanizing composition such as represented by chlorinated polyethylene or epichlorohydrin polymer, and to a vulcanized product thereof.

2. Description of the Prior Art

Generally, a chlorine-containing polymer is widely used as a material for a rubber product or a resin product, or as a material for an adhesive or a paint because of its excellent heat resistance, oil resistance, weather resistance, ozone resistance, and abrasion resistance. In particular, chlorinated polyethylene is attracting people's attention as a rubber material utilizing its excellent heat resistance, oil resistance, weather resistance, and ozone resistance.

Various proposals have already been made for vulcanization of chlorinated polyethylene. For example, organic peroxides and various sulphur-containing compounds such as mercaptotriazines are proposed as a vulcanizing agent for chlorinated polyethylene. It is also known to use various organic vulcanization accelerators such as an amine compound in combination with the vulcanizing agent for accelerating vulcanization of chlorinated polyethylene. It is a common knowledge of those skilled in the art that an acid receiving agent must be blended with a vulcanizing composition for absorbing an acid component generated in a small amount in vulcanizing chlorinated polyethylene. For example, Japanese Laid-open Patent Publication No. 55-39250/1980 proposes a metal compound selected from the group consisting of oxide, hydroxide, carboxylate, silicate, carbonate, phosphite, borate, basic sulfite and tribasic sulfate of a group IVA metal in the periodic table, as the acid receiving agent.

A vulcanizing composition disclosed in Japanese Laid-open Patent Publication 63-28047/1988 provides stability of a vulcanized product and a suitable vulcanization speed, and the patent publication gives oxide, hydroxide, carboxylate, silicate, carbonate, phosphite and borate of a group II metal in the periodic table, and oxide, basic phosphite, basic carbonate, basic carboxylate, basic sulfite, and tribasic sulfate of a group IVA metal in the periodic table as example of the metal compounds. Specific examples thereof include magnesia, magnesium hydroxide, barium hydroxide, magnesium carbonate, barium carbonate, slaked lime, quick lime, calcium carbonate, calcium silicate, calcium stearate, zinc stearate, calcium phthalate, magnesium phosphite, calcium phosphite, zinc white, tin oxide, litharge, red lead, white lead, dibasic lead phthalate, dibasic lead carbonate, tin stearate, basic lead phosphite, basic tin phosphite, basic lead sulfite and tribasic lead sulfate.

Japanese Laid-open Patent Publication 53-3439/1978, 54-58750/1979, 09-176433/1997, and others disclose a vulcanizing composition containing a thiadiazole compound as a vulcanizing agent for a chlorine-containing polymer, in which a basic metal oxide, a basic metal salt, a basic metal hydroxide, or the like is used as a compounding agent.

However, none of these vulcanizing compositions is a composition obtained by blending a zeolite compound as an acid receiving agent with a chlorine-containing polymer. Although these vulcanizing compositions provide vulcanized products having good vulcanization properties and are put into industrial use, they have a poor preservation stability and involves various restrictions in industrial rubber processing. For example, if the preservation stability of the vulcanizing composition is poor, vulcanization proceeds during preservation to make vulcanization molding impossible, whereby the vulcanizing composition must be discarded, desired vulcanization properties can not be obtained, or a dimension precision is greatly reduced, even though the vulcanization molding can be carried out.

Japanese Laid-open Patent Publication 58-18939/1983 discloses blending a specific aluminosilicate as a heat stabilizer with a chlorine-containing polymer. However, this does not contain a vulcanizing agent, i.e. is not one obtained by blending an aluminosilicate with a vulcanizing composition, much less gives a teaching of preservation stability of the vulcanizing composition.

Japanese Laid-open Patent Publications 07-157566/1995 and 07-286098/1995 disclose a polymer vulcanizing composition containing an epichlorohydrin polymer, a mercapto vulcanizing agent, and a hydrotalcite. However, this vulcanizing composition is not one obtained by blending a zeolite compound as an acid receiving agent.

Japanese Laid-open Patent Application 60-233138/1985 discloses a composition containing a chlorosulfonated polyolefin, an epoxy compound, and an A-type zeolite. However, this is a disclosure that the A-type zeolite preserves a white color of the chlorosulfonated polyolefin at the time of heating and increases the strength of the vulcanized product, and it also fails to give a teaching on the preservation stability of the vulcanizing composition.

SUMMARY OF THE INVENTION

In view of the above-mentioned circumstances, the object of the present invention is to provide a chlorine-containing polymer vulcanizing composition with improved preservation stability.

The inventors of the present invention have made various studies in order to solve the above problems, and found out that blending a zeolite compound as an acid receiving agent is effective in improving the preservation stability of a chlorine-containing polymer vulcanizing composition, thereby completing the present invention.

Accordingly, the present invention provides a chlorine-containing polymer vulcanizing composition obtained by blending with a chlorine-containing polymer, (a) a zeolite compound, (b) a vulcanizing agent, and (c) an optional organic vulcanization accelerator.

Further, the present invention provides a chlorine-containing polymer vulcanizing composition containing (d) an optional inorganic vulcanization accelerator in addition to the above-mentioned compounding agents (a), (b), and (c). By blending the (d) component, the vulcanization speed and the compression set can be improved.

DETAILED DESCRIPTION OF THE INVENTION

The term "chlorine-containing polymer" as a major component of the composition is used to include a polymer with chlorine directly bonded to a main chain of the polymer or a polymer obtained using a chlorine-containing monomer as a main constituent element, such as chlorinated polyethylene, an epichlorohydrin polymer, polyvinyl chloride, chloroprene rubber, chlorinated natural rubber or chlorosulfonated polyethylene; a polymer containing a small amount of chlorine as a cross-linking point, such as chlorinated butyl rubber; an acrylic rubber obtained by copolymerizing an acrylic monomer with a chlorine-containing monomer; and others.

These polymers can be each a commercially available product, and can be used without special limitation.

Among the above chlorine-containing polymers, chlorinated polyethylene is obtained by chlorinating polyethylene powder or particles in an aqueous suspension or in an organic solvent. In the present invention, chlorinated polyethylene is preferably obtained by chlorination in an aqueous suspension. The polyethylene to be used as a raw material is a homopolymer of ethylene or a copolymer of ethylene with a copolymerable comonomer. Examples of the comonomers include α-olefins such as propylene, 1-butene, 1-pentene, 1-hexene, 1-octene, and 4-methyl-pentene-1; acetates such as vinyl acetate and ethyl acetate; (meth) acrylic acid; and (meth)acrylic acid esters such as methyl (meth)acrylate and ethyl (meth)acrylate. The polyethylene has a weight-average molecular weight of preferably 40,000 to 700,000, more preferably 50,000 to 300,000.

The polyethylene to be used as a raw material can be a high density polyethylene and a blend of a high density polyethylene with a low density polyethylene.

The chlorine content of chlorinated polyethylene to be used in the present invention is preferably 20 to 50% by weight, more preferably 25 to 45% by weight, when the vulcanized product is to be used as a vulcanized rubber. If the chlorine content is too high or too low, the hardness of the composition to be obtained can be too high. An amorphous or substantially amorphous chlorinated polyethylene is preferable. If the vulcanized product is to be used as a vulcanized adhesive for rubber and metal, the chlorine content of the chlorinated polyethylene to be used in the present invention is preferably 50 to 75% by weight, more preferably 60 to 70% by weight. If the chlorine content is 50% by weight or lower, the adhesive power can be insufficient, whereas if the content is 75% by weight or higher, the chlorination takes a lot of time, so that it is not preferable.

Among the above chlorine-containing polymers, the epichlorohydrin polymer is a homopolymer of epichlorohydrin or a copolymer of epichlorohydrin with a copolymerable epoxide such as ethylene oxide, propylene oxide or allyl glycidyl ether. Examples of the epichlorohydrin polymers include epichlorohydrin homopolymer, epichlorohydrin-ethylene oxide copolymer, epichlorohydrin-propylene oxide copolymer, epichlorohydrin-ethylene oxide-allyl glycidyl ether terpolymer and epichlorohydrin-ethylene oxide-propylene oxide-allyl glycidyl ether tetrapolymer. Among these, preferred polymers are epichlorohydrin homopolymer, epichlorohydrin-ethylene oxide copolymer and epichlorohydrin-ethylene oxide-allyl glycidyl ether terpolymer. More preferred polymers are epichlorohydrin-ethylene oxide copolymer and epichlorohydrin-ethylene oxide-allyl glycidyl ether terpolymer. In these copolymers, it is preferable that an epichlorohydrin component is contained at least at 10 mol % in view of ensuring a practical vulcanization speed.

The molecular weight of the epichlorohydrin polymer is preferably $ML_{1+4}$ (100° C.)=about 30 to 150 typically in Mooney viscosity representation.

The chlorine content in the chlorosulfonated polyethylene to be used in the present invention is preferably 20 to 50% by weight, more preferably 25 to 45% by weight when it is to be used as a vulcanized rubber. If the chlorine content is too high or too low, the hardness of the obtained vulcanized rubber can be too high. The amount of the chlorosulfone group introduced as a vulcanizing point is preferably 1 to 2% by weight generally in terms of sulphur content. Usually, chlorosulfonated polyethylene having a molecular weight of $ML_{1+4}$ (100° C.)=about 20 to 150 in Mooney viscosity representation is used as it is. An amorphous or substantially amorphous chlorosulfonated polyethylene is preferable.

The chlorine-containing polymer can be a blend of a chlorine-containing polymer in a major proportion and another rubber and/or resin in a minor proportion. For example, the chlorinated polyethylene can be one obtained by blending a nitrile rubber, an acrylic rubber, or the like with chlorinated polyethylene. This blending is carried out for the purpose of improving oil resistance, heat resistance and others.

The zeolite compound (a) acts as an acid receiving agent, and greatly improves the preservation stability of the chlorine-containing polymer vulcanizing composition. This effect produced by using a zeolite compound as an acid receiving agent is unexpected and surprising.

The zeolite compound of the composition can be various kinds of zeolite, such as a natural zeolite, an A-type, X-type, or Y-type synthetic zeolite, a sodalite, a natural or synthetic mordenite, ZSM-5, or a metal substitution product thereof. These can be used either alone or in mixtures thereof. The metal in the metal substitution product is often sodium. It is preferable to use a zeolite compound which has a high acid receiving capability.

The method for producing synthetic zeolite is known. For example, in the hydrothermal synthesis method, oxide (base) of an alkali or alkali earth metal, alumina, silica, and water are used as starting materials, and these are allowed to react typically at a temperature of 100° C. or more, followed by precipitation of a zeolite crystal. It is possible to use a natural silicate mineral, for example, kaoline or clay such as allophene, or a volcanic glass as a starting material. For example, Japanese Examined Patent Publication 26-1119/51 discloses a method in which an active silicic acid obtained by treating an acid clay (montmorillonite) with an acid is allowed to react with a dilute sodium aluminate to produce a synthetic zeolite.

As the zeolite compound, it is preferable to use an activated zeolite compound. The term "activated zeolite compound" stands for one which is substantially free from water. Such activation can be carried out by heating to dehydrate a zeolite compound at a temperature of 100° C. or more in a dried air or nitrogen stream, or by introducing a zeolite compound at the time of kneading a chlorine-containing polymer with other components and exposing the resulting mixture to a kneading temperature of 140° C. to 200° C.

The vulcanizing agent is not specifically limited, and can be sulphur, a mercaptotriazine compound, a thiadiazole compound, 2,3-dimercaptoquinoxaline derivative, a thiourea compound, an amine, a thiuram compound, or the like.

The vulcanizing agent for chlorinated polyethylene is preferably a mercaptotriazine compound or a thiadiazole compound.

The mercaptotriazine compound can be a compound represented by the following general formula (I).

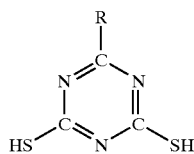

(I)

In the formula (I), R is a group selected from the group consisting of a mercapto group, an alkoxy group, an alkylamino group, a dialkylamino group, a cycloalkylamino group, a dicycloalkylamino group and an arylamino group.

Specific examples of the mercaptotriazine compounds include 2,4,6-trimercapto-1,3,5-triazine, 1-methoxy-3,5-dimercaptotriazine, 1-hexylamino-3,5-dimercaptotriazine, 1-diethylamino-3,5-dimercaptotriazine, 1-cyclohexylamino-3,5-dimercaptotriazine, 1-dibutylamino-3,5-dimercaptotriazine, 2-anilino-4,6-dimercaptotriazine, 1-phenylamino-3,5-dimercaptotriazine.

The thiadiazole compound can be a compound represented by the following general formula (II), (III), (IV), or (V).

$$R_1-S-C\underset{S}{\overset{N-N}{\underset{\|}{C}}}C-S-R_2 \quad (II)$$

$$R_1-S-C\underset{S}{\overset{N-N}{\underset{\|}{C}}}C-S-S-C\underset{S}{\overset{N-N}{\underset{\|}{C}}}C-S-R_2 \quad (III)$$

In the formulae (II) and (III), $R_1$ and $R_2$ are identical or different, and represent a hydrogen atom, a group —(C=O)$R_3$, or a group —$R_4OR_5$, wherein $R_3$ is an alkyl group having 1 to 17 carbon atoms, an aryl group having one or two ring(s), an acyl group having 7 to 14 carbon atoms, an aralkyl group having 7 to 8 carbon atoms, or a cyclohexyl group; and $R_4$ and $R_5$ are identical or different, and represent an alkyl group having 1 to 8 carbon atoms.

$$R_6-X-\underset{H}{\overset{R_8}{\underset{|}{C}}}-S-C\underset{S}{\overset{N-N}{\underset{\|}{C}}}C-S-\underset{H}{\overset{R_9}{\underset{|}{C}}}-X-R_7 \quad (IV)$$

$$R_6-X-\underset{H}{\overset{R_8}{\underset{|}{C}}}-S-C\underset{S}{\overset{N-N}{\underset{\|}{C}}}C-Sn-C\underset{S}{\overset{N-N}{\underset{\|}{C}}}C-S-\underset{H}{\overset{R_9}{\underset{|}{C}}}-X-R_7 \quad (V)$$

In the formulae (IV) and (V), $R_6$ and $R_7$ are identical or different, and represent an alkyl group having 1 to 8 carbon atoms; $R_8$ and $R_9$ are identical or different, and represent a hydrogen atom or an alkyl group having 1 to 8 carbon atoms; n is 1 or 2; and X is an oxygen atom or a sulphur atom.

Specific examples of the thiadiazole compounds include 2,5-dimercapto-1,3,4-thiadiazole, a monobenzoate derivative of 2,5-dimercapto-1,3,4-thiadiazole, and a dibenzoate derivative of 2,5-dimercapto-1,3,4-thiadiazole, and preferred examples are 2,5-dimercapto-1,3,4-thiadiazole, 5-mercapto-1,3,4-thiadiazole-2-thiobenzoate, 1,3,4-thiadiazolyl-2,5-dithiobenzoate, 5-mercapto-1,3,4-thiadiazole-2-thiostearate, 5-mercapto-1,3,4-thiadiazole-2-thio-1-naphthoate, 5-mercapto-1,3,4-thiadiazole-2-thiophenylacetate, 5-mercapto-1,3,4-thiadiazole-2-thiocyclohexylcarboxylate, 5-mercapto-1,3,4-thiadiazole-2-thio-p-toluate, 5-mercapto-1,3,4-thiadiazole-2-thiocinnamate, 2,5-di(butoxymethyl)-1,3,4-thiadiazole, 2,2'-dimercapto-5,5'-dithiobis(1,3,4-thiadiazole), 2,2'-di(butoxymethyl)-5,5'-dithiobis(1,3,4-thiadiazole), and the like.

Preferred examples of the vulcanizing agents for epichlorohydrin polymers include 2,3-dimercaptoquinoxaline derivatives and thiourea compounds in addition to the above-mentioned mercaptotriazine compounds and thiadiazole compounds.

Examples of the 2,3-dimercaptoquinoxaline derivatives include quinoxaline-2,3-dithiocarbonate, 6-methylquinoxaline-2,3-dithiocarbonate, 6-isopropylquinoxaline-2,3-dithiocarbonate, 5,8-dimethylquinoxaline-2,3-dithiocarbonate, and the like.

The thiourea compounds can be thiourea compounds such as an ethylenethiourea compound, a dialkylthiourea compound, and a trialkylthiourea compound. Specific examples thereof include 2-mercaptoimidazoline, 1,3-diethylthiourea, 1,3-dibutylthiourea, trimethylthiourea and the like.

The vulcanizing agent for a chlorosulfonated polyethylene can be a thiuram compound. A specific example thereof is dipentamethylenethiuram tetrasulfide.

These vulcanizing agents can be used either singly or in combination of two or more.

The organic vulcanization accelerator (c) can be a member selected from the group consisting of a primary amine, a secondary amine, a tertiary amine, an organic acid salt or adduct of said amine, an aldehyde-ammonia compound, an aldehyde-amine compound, a guanidine compound, a thiazole compound, a sulfeneamide compound, a thiuram compound, dithiocarbamic acid compound, 1,8-diazabicyclo(5,4,0)undecene-7 and a weak acid salt thereof, a quaternary ammonium salt compound and mixtures of two or more thereof. However, the vulcanizing agent is not limited thereto.

The primary amine, the secondary amine, and the tertiary amine are preferably an aliphatic or alicyclic amine having 5 to 20 carbon atoms. Examples of preferred amine include n-hexylamine, octylamine, dibutylamine, tributylamine, trioctylamine, di(2-ethylhexyl)amine, dicyclohexylamine, hexamethylenediamine, and the like.

The organic acid that forms a salt with the above-mentioned amine can be a carboxylic acid, a carbamic acid, 2-mercaptobenzothiazole, dithiophosphoric acid and the like. The substance that forms an addition product with the above-mentioned amine can be an alcohol or an oxime. Specific examples of the organic acid salt or the addition product of amine include n-butylamine acetate; dibutylamine oleate, hexamethylenediamine carbamate, a dicyclohexylamine salt of 2-mercaptobenzothiazole and the like.

Examples of the aldehyde-ammonia accelerator include hexamethylenetetramine, a reaction product of acetaldehyde and ammonia, and the like.

The aldehyde-amine accelerator can be, for example, a condensate of an amine with at least one aldehyde having 1 to 7 carbon atoms. Examples of preferred amine can be, for example, aniline, butylamine and the like. Among these, a condensate of aniline with an aldehyde having 1 to 7 carbon atoms is preferable. Specific examples thereof include a condensate aniline with butyraldehyde, a condensate of aniline with heptaldehyde, a condensate of aniline with acetaldehyde and butyraldehyde.

The guanidine accelerator can be diaryl guanidine such as diphenylguanidine, ditolylguanidine or the like.

The thiazole accelerator can be, for example, 2-mercaptobenzothiazole, dibenzothiazyl disulfide, a zinc salt of 2-mercaptobenzothiazole or the like.

The sulfeneamide accelerator comprises a 2-benzothiazylsulfeneamide of a primary amine or a secondary amine represented by the general formula (VI).

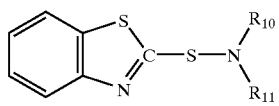

(VI)

In the formula (VI), $R_{10}$ and $R_{11}$ are identical or different, and represent a hydrogen atom, an alkyl group having 1 to 12 carbon atoms, a cycloalkyl group having 1 to 12 carbon atoms, or an aralkyl group having 1 to 12 carbon atoms, excluding the case where $R_{10}$ and $R_{11}$ are both a hydrogen atom. $R_{10}$ and $R_{11}$ can be bonded to form a ring via or not via hetero atom(s).

Examples of the primary amine or the secondary amine that forms a sulfeneamide include cyclohexylamine, butylamines, diethylamine, dipropylamines, dioctylamines, dilaurylamines, dicyclohexylamine, piperidine, pipecoline, morpholine, and piperazine.

Specific examples of the sulfeneamide organic vulcanization accelerators include N-ethyl-2-benzothiazylsulfeneamide, N-t-butyl-2-benzothiazylsulfeneamide, N,N-di-isopropyl-2-benzothiazylsulfeneamide, N,N-di-n-butyl-2-benzothiazylsulfeneamide, N,N-di-cyclohexyl-2-benzothiazylsulfeneamide, N-oxy-diethylene-2-benzothiazylsulfeneamide and the like.

The thiuram accelerator comprises a thiuram sulfide compound represented by the following general formula (VII).

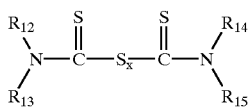

(VII)

In the formula (VII), $R_{12}$ and $R_{13}$, $R_{14}$ and $R_{15}$ are identical or different, and represent, for example, an alkyl group, an aryl group, a cycloalkyl group, or an aralkyl group. $R_{12}$ and $R_{13}$ and/or $R_{14}$ and $R_{15}$ can be bonded each other to form a ring via or not via hetero atom(s).

Specific examples of the thiuram accelerators include tetramethylthiuram disulfide, tetramethylthiuram monosulfide, tetraethylthiuram disulfide, tetrabutylthiuram disulfide, dipentamethylenethiuram tetrasulfide and the like.

The dithiocarbamic acid accelerator is exemplified by piperidine pentamethylenedithiocarbamate, zinc dimethyldithiocarbamate, copper dimethylcarbamate or the like.

The above-mentioned accelerator can be in a form of predispersion in an inorganic filler, an oil, a polymer or the like.

The compound 1,8-diazabicyclo(5,4,0)-undecene-7 (hereafter referred to as DBU) is a compound represented by the following formula (VIII).

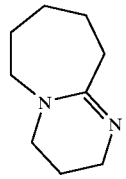

(VIII)

The weak acid salt of DBU can be a carbonate, a carboxylate, a salt with a phenolic substance, a salt with an enolic substance, a salt with a thiol or the like. Examples of the acids that constitute these salts include carbonic acid, acetic acid, formic acid, sorbic acid, salicylic acid, β-oxynaphthoic acid, phenol, phthalic acid, cyanuric acid, mercaptobenzothiazole, mercaptobenzoimidazole, and phenolic resins, phenol novolak resins and the like.

Also, it is possible to use DBU by dissolving it into a liquid substance such as a higher alcohol or a glycol; to use DBU in a powder state by dispersing it in an inorganic filler; or to use DBU in a sheet-like or pellet-like form by incorporating it into a polymer substance.

The quaternary ammonium salt compound to be used as the organic vulcanization accelerator is a compound represented by the following general formula (IX).

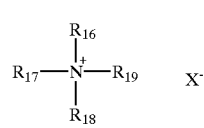

(IX)

In the formula (IX), $R_{16}$, $R_{17}$, $R_{18}$, and $R_{19}$ are identical or different, and represent a group selected from an alkyl group having 1 to 17 carbon atoms, a cyclohexyl group, a phenyl group, and a benzyl group. Examples of the above alkyl group having 1 to 17 carbon atoms include methyl, propyl, butyl, hexyl, heptyl, octyl, decyl, dodecyl, hexadecyl and the like. X is an anion and can be, for example, a halide anion such as fluoride ion, bromide ion, chloride ion or iodine ion.

These organic vulcanization accelerators may be used either singly or in combination of two or more.

The inorganic vulcanization accelerator (d) can be a compound selected from the group consisting of a basic metal oxide, a basic metal salt, a basic metal hydroxide, a basic silicon dioxide, a silicate, and a hydrotalcite. However, the inorganic vulcanization accelerator (d) is not limited thereto.

Specific examples of the inorganic vulcanization accelerator (d) include magnesium oxide, calcium oxide, aluminum oxide, magnesium hydroxide, calcium hydroxide, aluminum hydroxide, calcium carbonate, basic silicon dioxide, calcium silicate, synthetic hydrotalcite and the like. The inorganic vulcanization accelerator is suitably selected in accordance with the other compounding agents.

Making much of preservation stability of the composition, it is preferable to use a basic metal carbonate. The inorganic vulcanization accelerator can be surface-treated before use.

The inorganic vulcanization accelerator is added preferably at 0 to 20 parts by weight. If it is added at more than 20 parts by weight, the accelerator does not exhibit an increased effect and merely exhibits an effect as a filler.

A polyvalent hydroxyl compound can be added in order to adjust the vulcanization speed. Such a polyvalent hydroxyl compound can be, for example, a trivalent to hexavalent alcohol such as glycerin, ethylene glycol, sorbit, trimethylolpropane or trimethylolethane, but is not limited thereto.

It is also possible to use the above-mentioned inorganic vulcanization accelerator as an additive which is generally called a "filler" in the rubber industry.

One suitable embodiment of the present invention is a chlorine-containing polymer vulcanizing composition obtained by blending, with a chlorine-containing polymer, (a) a zeolite compound, (b) a vulcanizing agent, and (c) an organic vulcanization accelerator comprising a member selected from the group consisting of a primary amine, a secondary amine, a tertiary amine, an organic acid salt or adduct thereof, an aldehyde-ammonia accelerator, an aldehyde-amine accelerator, a guanidine accelerator, a thiazole accelerator, a sulfeneamide accelerator, a thiuram accelerator, dithiocarbamic acid accelerator, DBU and a weak acid salt thereof, a quaternary ammonium salt compound and mixtures of two or more thereof.

A vulcanizing composition in which the above chlorine-containing polymer is a chlorinated polyethylene, an epichlorohydrin polymer, or a chlorosulfonated polyethylene is especially preferable.

The contents of the components in the chlorine-containing polymer vulcanizing composition is such that, with respect to 100 parts by weight of the chlorine-containing polymer, (a) preferably 0.5 to 30 parts by weight, more preferably 5 to 25 parts by weight, of the zeolite compound, (b) preferably 0.1 to 5 parts by weight, more preferably 0.5 to 3 parts by weight, of the vulcanizing agent, and (c) preferably 0.5 to 3 mol, more preferably 0.7 to 1.5 mol, of the organic vulcanization accelerator with respect to 1 mol of the vulcanizing agent are blended.

Another suitable embodiment of the present invention is a chlorine-containing polymer vulcanizing composition obtained by blending, with a chlorine-containing polymer, (a) a zeolite compound, (b) a thiadiazole compound, and (c) an organic vulcanization accelerator comprising a member selected from the group consisting of a primary amine, a secondary amine, a tertiary amine, an organic acid salt or adduct thereof, an aldehyde-ammonia accelerator, an aldehyde-amine accelerator, a guanidine accelerator, a thiazole accelerator, a sulfeneamide accelerator, a thiuram accelerator, dithiocarbamic acid accelerator, DBU and a weak acid salt thereof, a quaternary ammonium salt compound and mixtures of two or more thereof, and (d) a compound selected from the group consisting of a basic metal oxide, a basic metal salt, a basic silicon dioxide, a silicate and a hydrotalcite.

A vulcanizing composition in which the above chlorine-containing polymer is chlorinated polyethylene or an epichlorohydrin polymer is especially preferable.

The contents of the components in the chlorine-containing polymer vulcanizing composition is such that, with respect to 100 parts by weight of the chlorine-containing polymer, (a) preferably 0.5 to 30 parts by weight, more preferably 5 to 25 parts by weight, of the zeolite compound, (b) preferably 0.1 to 5 parts by weight, more preferably 0.5 to 3 parts by weight, of the vulcanizing agent, (c) preferably 0.5 to 3 mol, more preferably 0.7 to 1.5 mol, of the organic vulcanization accelerator with respect to 1 mol of the vulcanizing agent, and (d) preferably 0.1 to 10 parts by weight, more preferably 1 to 5 parts by weight, of the inorganic vulcanization accelerator are blended.

A vulcanized product having good vulcanization properties can be obtained by vulcanizing the above chlorine-containing polymer vulcanizing composition.

In the present specification, "good preservation stability" means that the difference (hereafter referred to as $\Delta Vm$) between the Vm value (the lowest Mooney viscosity) of the vulcanizing composition immediately after the kneading in the Mooney Scorch test as defined by JIS (Japanese Industrial Standard) K6300 (physical test method for unvulcanized rubber) and the Vm value of the composition in the Mooney Scorch test as measured after it was left to stand for 3 or 7 days at 35° C. under humidity of 75% after the kneading, is small.

The tensile physical property (hereafter referred to as initial physical properties) was measured according to JIS K6251, and the compression set was measured according to JIS K6262.

Into the vulcanizing composition of the present invention may be added various additives generally used in the field of the art, for example, a filler, a reinforcing agent, a plasticizer, a stabilizer, an anti-aging agent, a lubricant, a viscosity-imparting agent, a pigment, a flame-retardant, an ultraviolet absorber, a foaming agent, a vulcanization moderator, and the like, if necessary. A short fiber or the like can be added to improve the strength and the rigidity.

In order to prepare the vulcanizing composition of the present invention, the above compounding agents are kneaded by means of an ordinary mixing roll, a Banbury mixer, a twin-screw kneading extruder, or the like kneader, and the kneaded product is then formed into a desired sheet-like shape by means of an oven roll or the like. The molding or the vulcanization is carried out by means of a pressing machine, an extruder, an injection-molding machine or the like to give a rubber product having a desired shape. The vulcanization condition is suitably selected within the range of 100 to 200° C. and several minutes to two hours.

A laminated product and a laminated hose having a layer of the above vulcanizing composition can be prepared applying a well-known general lamination process or an extrusion-molding technique. For example, the laminated product can be obtained by laminating the layer of the above vulcanizing composition directly on a layer made of epichlorohydrin rubber, nitrile rubber, nitrile rubber having polyvinyl chloride blended therewith, or acrylic rubber, followed by vulcanizing the composition. Also, the laminated hose can be obtained by molding a hose including an inner layer made of epichlorohydrin rubber, nitrile rubber, nitrile rubber having polyvinyl chloride blended therewith, or acrylic rubber, and an outer layer made of the above vulcanizing composition, followed by vulcanizing the composition.

DESCRIPTION OF THE PREFERRED EMBODIMENTS

Specific embodiments for practicing the present invention will be described with reference to the following Examples. However, the present invention is not limited by the following Examples unless it departs from the spirit and scope of the present invention.

The details of the compounding agents used in the Examples and Comparative Examples are as follows.

Chlorinated polyethylene; "DAISOLAC H-135" manufactured by DAISO CO., LTD., with a chlorine content of 35%

Epichlorohydrin polymer; ethylene/epichlorohydrin copolymer, "EPICHLOMER C" manufactured by DAISO CO., LTD., with a chlorine content of 25%

Chlorosulfonated polyethylene; "HYPALON 40" manufactured by DuPont Dow Elastomers NBR/PVC: "NV75" manufactured by JSR Corporation, a blended product of NBR/PVC=70/30

Reinforcing agent; FEF carbon black, "SEAST SO" manufactured by Tokai Carbon Co., Ltd.

Plasticizer I; diisodecyl adipate, "DIDA" manufactured by Daihachi Chemical Industry Co., Ltd.

Plasticizer II; "ADEKACIZER RS107" manufactured by Asahi Denka Kogyo K. K.

Plasticizer III; dioctyl phthalate

Lubricant; sorbitan monostearate, "SPLENDER R300" manufactured by Kao Corporation Acid receiving agent I; synthetic zeolite (I), A-type zeolite, "MIZUKALIZER DS" manufactured by Mizusawa Industrial Chemicals, Ltd.

Acid receiving agent II; synthetic zeolite (II), X-type zeolite, "Molecular Sieves 13X" manufactured by Wako Pure Chemical Industries, Ltd.

Acid receiving agent III; highly active magnesium oxide, "MgO#150" manufactured by Kyowa Chemical Industry Co., Ltd.

Vulcanizing agent I; 2,4,6-trimercapto-1,3,5-triazine

Vulcanizing agent II; 2-anilino-4,6-dimercaptotriazine

Vulcanizing agent III; 2,5-dimercapto-1,3,4-thiadiazole

Vulcanizing agent IV; 2,2'-dimercapto-5,5'-dithiobis(1,3,4-thiadiazole)

Vulcanizing agent V; 2,2'-di(butoxymethyl)-5,5'-dithiobis(1,3,4-thiadiazole)

Vulcanizing agent VI; dipentamethylenethiuram tetrasulfide

Vulcanizing agent VII; 6-methylquinoxaline-2,3-dithiocarbonate

Organic vulcanization accelerator I; dicyclohexylamine salt of 2-mercaptobenzothiazole Organic vulcanization accelerator II; dibutylamine Organic vulcanization accelerator III; condensate of n-butyraldehyde with aniline, "NOCCELER 8" manufactured by Ouchi-Shinko Chemical Industrial Co., Ltd.

Organic vulcanization accelerator IV; N.N-dicyclohexyl-2-benzothiazolylsulfeneamide, "NOCCELER DZ" manufactured by Ouchi-Shinko Chemical Industrial Co., Ltd.

Organic vulcanization accelerator V; tetrabutylammonium chloride

Organic vulcanization accelerator VI; tetramethylthiuram disulfide, "NOCCELER TT" manufactured by Ouchi-Shinko Chemical Industrial Co., Ltd.

Organic vulcanization accelerator VII; N-cyclohexyl-2-benzothiazolylsulfeneamide, "NOCCELER CZ" manufactured by Ouchi-Shinko Chemical Industrial Co., Ltd.

Organic vulcanization accelerator VIII; a salt of DBU and a phenolic resin, "P-152" manufactured by DAISO CO., LTD.

Organic vulcanization accelerator IX; dibenzothiazyl disulfide, "NOCCELER DM" manufactured by Ouchi-Shinko Chemical Industrial Co., Ltd.

Organic vulcanization accelerator X; tetramethylthiuram monosulfide, "NOCCELER TS" manufactured by Ouchi-Shinko Chemical Industrial Co., Ltd.

Inorganic vulcanization accelerator I; calcium carbonate, "HAKUENKA O" manufactured by Shiraishi Kogyo Kaisha, Ltd.

Inorganic vulcanization accelerator II; resin acid-treated calcium carbonate, "HAKUENKA CC" manufactured by Shiraishi Kogyo Kaisha, Ltd.

Inorganic vulcanization accelerator III; light calcium carbonate, "SILVER W" manufactured by Shiraishi Kogyo Kaisha, Ltd.

Inorganic vulcanization accelerator IV; calcium silicate, "SOLEX CM" manufactured by TOKUYAMA CORPORATION Inorganic vulcanization accelerator V; white filler, basic silicon dioxide (pH=10), "CARPLEX #1120" manufactured by Shionogi & Co., Ltd.

White filler I; magnesium silicate, "MISTRON VAPOR TALC" manufactured by Nihon Mistron Co., Ltd.

White filler II; magnesium silicate, "HIGH TORON" manufactured by TAKEHARA KAGAKUKOGYO Co., Ltd.

White filler III; anhydrous aluminum silicate, "ICE BERG" manufactured by Burgess Pigment Company Anti-aging agent; nickel dibutyldithiocarbamate, "NOCRAC NBC" manufactured by Ouchi-Shinko Chemical Industrial Co., Ltd.

White carbon: "Nip SIL VN-3" manufactured by Nippon Silica Industrial Co., Ltd.

Light calcium carbonate: "AKADAMA" manufactured by Shiraishi Kogyo Kaisha, Ltd.

Calcium hydroxide: "CARBIT" manufactured by Ohmi Chemical Industry Co., Ltd.

Anti-scorching agent: N-(cyclohexylthio)phthalimide, "PVI" manufactured by Monsanto Japan, Ltd.

EXAMPLE 1

Referring to Table 1, to 100 parts by weight of chlorinated polyethylene were added 60 parts by weight of carbon black as a reinforcing agent and 30 parts by weight of diisodecyl adipate as a plasticizer, followed by kneading the resulting mixture at 130° C. for 6 minutes in a kneader. Then, 2 parts by weight of synthetic zeolite (I) as an acid receiving agent, 1.25 parts by weight of 2,4,6-trimercapto-1,3,5-triazine as a vulcanizing agent, and 2.5 parts by weight of dicyclohexylamine salt of 2-mercaptobenzothiazole as an organic vulcanization accelerator were added to the above kneaded product, followed by further kneading the product by means of a roll heated to 70 to 80° C. to produce a sheet-like rubber composition having a thickness of 2 to 3 mm for vulcanization. This rubber composition was put into a mold of 15×15 cm and heated at 160° C. at 100 kg/cm² for 15 minutes in a pressing machine to give a vulcanized product. In addition, a vulcanized product for compression set test was prepared by heating at 160° C. at 100 kg/cm² for 20 minutes.

EXAMPLES 2 TO 4 AND COMPARATIVE EXAMPLE 1

A sheet-like rubber composition for vulcanization was obtained in the same manner as in Example 1 except that the blending materials shown in Table 1 were used in ratios shown in Table 1, and further a vulcanized rubber was obtained.

EXAMPLES 5 TO 8

By using the blending materials shown in Table 2 in ratios shown in Table 2, a reinforcing agent, a plasticizer, and an acid receiving agent (a) were added to chlorinated polyethylene, followed by kneading the mixture at 130° C. in Example 5, at 150° C. in Example 6, at 170° C. in Example 7, and at 190° C. in Example 8 for 6 minutes, by means of a kneader. Then, a vulcanizing agent and an organic vulcanization accelerator were added to the kneaded product, followed by further kneading the whole mixture by means of a roll heated to 70 to 80° C. Thereafter, the same operations as in Example 1 were carried out to give a sheet-like rubber composition for vulcanization, and further a vulcanized rubber was obtained.

EXAMPLES 9 AND 10

By using the blending materials shown in Table 2 in ratios shown in Table 2, a sheet-like rubber composition for vulcanization was obtained in the same manner as in Example 1 except that a synthetic zeolite (I) activated by calcination under a nitrogen stream at 200° C.×30 minutes was used as an acid receiving agent, and further a vulcanized rubber was obtained.

EXAMPLES 11 TO 13

A sheet-like rubber composition for vulcanization was obtained in the same manner as in Example 8 except that the blending materials shown in Table 3 were used in ratios shown in Table 3, and further a vulcanized rubber was obtained.

The blending materials, the blending ratios thereof, and the kneading temperature (the temperature in kneading a mixture with no vulcanizing agent and with no organic vulcanization accelerator) used in Examples and Comparative Examples are shown in Tables 1 to 3.

EXAMPLES 14 TO 16 AND COMPARATIVE EXAMPLES 2 TO 3

A composition for vulcanization and a vulcanized product were obtained in the same manner as in Example 1 by using the compounding agents shown in Table 4 and adding a different thiadiazole vulcanizing agent.

EXAMPLES 17 TO 24

A composition for vulcanization and a vulcanized product were obtained in the same manner as in Example 1 by using the compounding agents shown in Table 5 and changing the kind of the inorganic vulcanization accelerator.

EXAMPLES 25 TO 30 AND COMPARATIVE EXAMPLE 5

A white composition for vulcanization and a white vulcanized product were obtained in the same manner as in Example 1 by using the compounding agents shown in Table 6 and adding a white filler or an inorganic vulcanization accelerator.

EXAMPLE 31 AND COMPARATIVE EXAMPLE 6

A composition for vulcanization and a vulcanized product were obtained in the same manner as in Example 1 by using the compounding agents shown in Table 7 and using an epichlorohydrin polymer as the chlorine-containing polymer. The heating to obtain the vulcanized product was carried out at 170° C.

EXAMPLES 32 TO 35

A sheet-like rubber composition for vulcanization of chlorinated polyethylene having a thickness of 2 to 3 mm was prepared in the same manner as in Example 1 by using the compounding agents shown in Table 9.

A sheet-like rubber composition for vulcanization made of a blend of acrylonitrile butadiene polymer/polyvinyl chloride (hereafter referred to as NBR/PVC) shown in Table 8 and a sheet-like rubber composition for vulcanization made of epichlorohydrin (hereafter referred to as ECO) were prepared.

The sheet-like NBR/PVC rubber composition for vulcanization or the sheet-like ECO rubber composition and a sheet-like rubber composition for vulcanization of chlorinated polyethylene of this Example were superposed. This superposed product was press-bonded at 80° C. for 100 kg/cm² for 5 minutes, followed by steam vulcanization at 160° C. for 20 minutes to give a vulcanized laminated product.

EXAMPLES 36 TO 38 AND COMPARATIVE EXAMPLES 7 TO 8

A composition for vulcanization and a vulcanized product were obtained in the same manner as in Example 1 by using the compounding agents shown in Table 10 and using chlorosulfonated polyethylene as the chlorine-containing polymer.

EXAMPLES 39 TO 41 AND COMPARATIVE EXAMPLE 9

A composition for vulcanization and a vulcanized product were obtained in the same manner as in Example 1 by using the compounding agents shown in Table 11 and using an epichlorohydrin polymer as the chlorine-containing polymer. The heating to obtain the vulcanized product was carried out at 170° C.

TABLE 1

|  | Example 1 | Example 2 | Example 3 | Example 4 | Comparative Example 1 |
| --- | --- | --- | --- | --- | --- |
| Chlorinated polyethylene | 100 | 100 | 100 | 100 | 100 |
| Reinforcing agent | 60 | 60 | 60 | 60 | 60 |
| Plasticizer I | 30 | 30 | 30 | 30 | 30 |
| Acid receiving agent I | 2 | 5 | 10 | 20 |  |
| Acid receiving agent III |  |  |  |  | 10 |
| Vulcanizing agent I | 1.25 | 1.25 | 1.25 | 1.25 | 1.25 |
| Organic vulcanization accelerator I | 2.5 | 2.5 | 2.5 | 2.5 | 2.5 |
| Kneading temperature (° C.) | 130 | 130 | 130 | 130 | 130 | parts by weight

TABLE 2

|  | Example 5 | Example 6 | Example 7 | Example 8 | Example 9 | Example 10 |
|---|---|---|---|---|---|---|
| Chlorinated polyethylene | 100 | 100 | 100 | 100 | 100 | 100 |
| Reinforcing agent | 60 | 60 | 60 | 60 | 60 | 60 |
| Plasticizer I | 30 | 30 | 30 | 30 | 30 | 30 |
| Acid receiving agent I | 10 | 10 | 10 | 10 | (calcination) 10 | (calcination) 10 |
| Vulcanizing agent I | 1.25 | 1.25 | 1.25 | 1.25 | 1.25 | 1.25 |
| Organic vulcanization accelerator I | 2.5 | 2.5 | 2.5 | 2.5 | 2.5 | 2.5 |
| Kneading temperature (° C.) | 130 | 150 | 170 | 190 | 130 | 190 | parts by weight

TABLE 3

|  | Example 11 | Example 12 | Example 13 |
|---|---|---|---|
| Chlorinated polyethylene | 100 | 100 | 100 |
| Reinforcing agent | 60 | 60 | 60 |
| Plasticizer I | 30 | 30 | 30 |
| Acid receiving agent I |  | 10 | 10 |
| Acid receiving agent II | 10 |  |  |
| Vulcanizing agent I | 1.25 | — | 1.25 |
| Vulcanizing agent II | — | 1.25 | — |
| Organic vulcanizing accelerator I | 2.5 | 2.5 | — |
| Organic vulcanizing accelerator II | — | — | 0.9 |
| Kneading temperature (° C.) | 190 | 190 | 190 | parts by weight

TABLE 4

|  | Comparative Example 2 | Example 14 | Comparative Example 3 | Example 15 | Comparative Example 4 | Example 16 |
|---|---|---|---|---|---|---|
| Chlorinated polyethylene | 100 | 100 | 100 | 100 | 100 | 100 |
| Reinforcing agent | 60 | 60 | 60 | 60 | 60 | 60 |
| Plasticizer I | 35 | 35 | 35 | 35 | 35 | 35 |
| Lubricant | 2 | 2 | 2 | 2 | 2 | 2 |
| Acid receiving agent III | 10 | — | 10 | — | 10 | — |
| Acid receiving agent I | — | 10 | — | 10 | — | 10 |
| Vulcanizing agent III | 2 | 2 | — | — | — | — |
| Vulcanizing agent IV | — | — | 2.53 | 2.53 | — | — |
| Vulcanizing agent V | — | — | — | — | 4 | 4 |
| Organic vulcanization accelerator III | 1.5 | 1.5 | 1.5 | 1.5 | 1.5 | 1.5 |
| Inorganic vulcanization accelerator I | — | — | — | 2 | — | 2 | parts by weight

TABLE 5

|  | 17 | 18 | Example 19 | Example 20 | Example 21 | Example 22 | Example 23 | Example 24 |
|---|---|---|---|---|---|---|---|---|
| Chlorinated polyethylene | 100 | 100 | 100 | 100 | 100 | 100 | 100 | 100 |
| Reinforcing agent | 60 | 60 | 60 | 60 | 60 | 60 | 60 | 60 |
| Plasticizer I | 35 | 35 | 35 | 35 | 35 | 35 | 35 | 35 |
| Lubricant | 2 | 2 | 2 | 2 | 2 | 2 | 2 | 2 |
| Acid receiving agent I | 10 | 10 | 10 | 10 | 10 | 10 | 10 | 10 |
| Vulcanizing agent III | 2 | 2 | 2 | 2 | 2 | 2 | 2 | 2 |
| Organic vulcanization accelerator III | 1.5 | 1.5 | 1.5 | 1.5 | 1.5 | 1.5 | 1.5 | 1.5 |
| Inorganic vulcanization accelerator II | — | 2 | — | — | — | — | — | — |
| Inorganic vulcanization accelerator III | — | — | 2 | — | — | — | — | — |
| Inorganic vulcanization accelerator IV | — | — | — | 2 | — | — | — | — |
| Inorganic vulcanization accelerator I | — | — | — | — | 0.5 | 1 | 2 | 4 | parts by weight

TABLE 6

|  | Comparative Example 5 | Example 25 | Example 26 | Example 27 | Example 28 | Example 29 | Example 30 |
|---|---|---|---|---|---|---|---|
| Chlorinated polyethylene | 100 | 100 | 100 | 100 | 100 | 100 | 100 |
| White filler I | 80 | 80 | — | — | — | — | — |
| White filler II | — | — | 80 | — | — | 60 | 40 |
| White filler III | — | — | — | 80 | — | — | — |
| Inorganic vulcanization accelerator II | — | — | — | — | 80 | — | — |
| Inorganic vulcanization accelerator V | | | | | | 10 | 20 |
| Plasticizer I | 35 | 35 | 35 | 35 | 35 | 35 | 35 |
| Lubricant | 2 | 2 | 2 | 2 | 2 | 2 | 2 |
| Acid receiving agent III | 10 | — | — | — | — | — | — |
| Acid receiving agent I | — | 10 | 10 | 10 | 10 | 10 | 10 |
| Vulcanizing agent III | 2 | 2 | 2 | 2 | 2 | 2 | 2 |
| Organic vulcanization accelerator III | 1.5 | 1.5 | 1.5 | 1.5 | 1.5 | 1.5 | 1.5 |
| Inorganic vulcanization accelerator I | 2 | 2 | 2 | 2 | 2 | 2 | 2 | parts by weight

TABLE 7

|  | Comparative Example 6 | Example 31 |
|---|---|---|
| Epichlorohydrin polymer | 100 | 100 |
| Reinforcing agent | 50 | 50 |
| Plasticizer II | 10 | 10 |
| Lubricant | 2 | 2 |
| Anti-aging agent | 1 | 1 |
| Acid receiving agent III | 10 | — |
| Acid receiving agent I | — | 10 |
| Vulcanizing agent III | 1.5 | 1.5 | parts by weight

TABLE 8

|  | parts by weight |
|---|---|
| NBR/PVC rubber composition | |
| NBR/PVC | 100 |
| Reinforcing agent | 90 |
| Plasticizer III | 15 |
| stearic acid | 1 |
| Anti-aging agent | 1 |
| Zinc white | 5 |
| Organic vulcanization accelerator VI | 1 |
| Organic vulcanization accelerator VII | 0.5 |
| Sulfur | 0.5 |
| ECO rubber composition | |
| EPICHLOMER C | 100 |
| Reinforcing agent | 50 |
| Plasticizer III | 20 |
| White carbon | 10 |
| Light calcium carbonate | 15 |
| Anti-aging agent | 1 |
| Lubricant | 1.5 |
| Organic vulcanization accelerator VIII | 1 |
| Calcium hydroxide | 1.5 |
| Vulcanizing agent VII | 1.5 |

TABLE 9

|  | Example 32 | Example 33 | Example 34 | Example 35 |
|---|---|---|---|---|
| Chlorinated polyethylene | 100 | 100 | 100 | 100 |
| White filler II | 80 | 80 | 80 | 80 |
| Plasticizer I | 35 | 35 | 35 | 35 |
| Lubricant | 2 | 2 | 2 | 2 |
| Acid receiving agent I | 10 | 10 | 10 | 10 |
| Vulcanizing agent III | 2 | 2 | 2 | 2 |
| Organic vulcanization accelerator III | 3 | — | — | — |
| Organic vulcanization accelerator IV | — | 1.2 | — | — |
| Organic vulcanization accelerator I | — | — | 2.4 | — |
| Organic vulcanization accelerator V | — | — | — | 1.3 |
| Inorganic vulcanization accelerator II | — | 2 | — | 2 | parts by weight

TABLE 10

|  | Comparative Example 7 | Example 36 | Example 37 | Comparative Example 8 | Example 38 |
|---|---|---|---|---|---|
| Chlorosulfonated polyethylene | 100 | 100 | 100 | 100 | 100 |
| Reinforcing agent | 60 | 60 | 60 | — | — |

TABLE 10-continued

|  | Comparative Example 7 | Example 36 | Example 37 | Comparative Example 8 | Example 38 |
|---|---|---|---|---|---|
| White filler II | — | — | — | 80 | 80 |
| Plasticizer I | 35 | 35 | 35 | 35 | 35 |
| Lubricant | 2 | 2 | 2 | 2 | 2 |
| Acid receiving agent III | 10 | — | — | 10 | — |
| Acid receiving agent I | — | 10 | 10 | — | 10 |
| Inorganic vulcanization accelerator II | — | — | 2 | — | 2 |
| Vulcanizing agent VI | 2 | 2 | 2 | 2 | 2 |
| Organic vulcanization accelerator IX | 1 | 1 | 1 | 1 | 1 | parts by weight

TABLE 11

|  | Comparative Example 9 | Example 39 | Example 40 | Example 41 |
|---|---|---|---|---|
| Epichlorohydrin polymer | 100 | 100 | 100 | 100 |
| Reinforcing agent | 50 | 50 | 50 | 50 |
| Plasticizer II | 10 | 10 | 10 | 10 |
| Lubricant | 3 | 3 | 3 | 3 |
| Anti-aging agent | 1 | 1 | 1 | 1 |
| Acid receiving agent III | 3 | — | — | — |
| Acid receiving agent I | — | 5 | 10 | 10 |
| Anti-scorching agent | 1 | 1 | 1 | 1 |
| Vulcanizing agent I | 1.2 | 1.2 | 1.2 | — |
| Organic vulcanization accelerator X | 0.5 | 0.5 | 0.5 | — |
| Vulcanizing agent VII | — | — | — | 1.7 | parts by weight

Performance Test

In the Examples and Comparative Examples, the chlorinated polyethylene vulcanizing composition immediately after the kneading was subjected to the Mooney Scorch test as prescribed by JIS K6300 (physical test method for non-vulcanized rubber) to give the Vm value (125° C.). Then the composition was subjected to the Mooney Scorch test after it was left to stand for 3 days or 7 days at 35° C. under humidity of 75% after the kneading to give the Vm value (125° C.). The difference ($\Delta$Vm) of these Vm values was determined.

Also, physical property tests were carried out on the obtained vulcanized products according to JIS K6251 (tensile test method for vulcanized rubber), JIS 6253 (hardness test method for vulcanized rubber) and JIS K6262 (compression set test method for vulcanized rubber).

The obtained test results are shown in Tables 12 to 21.

Laminated products of Examples 32 to 35 were cut into 1 cm in width, and a peeling test was carried thereon according to JIS K6256 (adhesion test method for vulcanized rubber). In the Table 19, the term "CPE destruction" for representing a peeled state of the peeling test means that a rubber destruction occurred at the chlorinated polyethylene portion.

TABLE 12

|  | Example 1 | Example 2 | Example 3 | Example 4 | Comparative Example 1 |
|---|---|---|---|---|---|
| Mooney scorch |  |  |  |  |  |
| 125° C. Vm | 55.5 | 50.8 | 53.1 | 52.3 | 61.8 |
| $t_5$ (min) | 7.0 | 7.4 | 7.2 | 7.1 | 7.4 |
| preservation stability (3 days) |  |  |  |  |  |
| $\Delta$ Vm | +2 | +1 | +2 | +4 | +17 |
| $t_5$ (min) | 7.1 | 6.7 | 6.9 | 7.5 | 19.5 |
| initial physical properties |  |  |  |  |  |
| $M_{100}$ (MPa) | 3.3 | 3.3 | 4.0 | 4.3 | 5.2 |
| $M_{300}$ (MPa) | 12.5 | 12.5 | 14.0 | 14.8 | 17.9 |
| Tb (MPa) | 19.7 | 19.8 | 19.8 | 18.9 | 21.3 |
| Eb (%) | 535 | 510 | 470 | 415 | 390 |
| Hs (JIS A) | 67 | 66 | 68 | 71 | 69 |
| compression set (%) | 49 | 46 | 43 | 36 | 38 |

TABLE 13

|  | Example 5 | Example 6 | Example 7 | Example 8 | Example 9 | Example 10 |
|---|---|---|---|---|---|---|
| Mooney scorch |  |  |  |  |  |  |
| 125° C. Vm | 50.2 | 53.3 | 52.5 | 53.6 | 54.1 | 54.1 |
| $t_5$ (min) | 7.8 | 7.7 | 7.7 | 7.9 | 7.5 | 7.6 |

TABLE 13-continued

|  | Example 5 | Example 6 | Example 7 | Example 8 | Example 9 | Example 10 |
|---|---|---|---|---|---|---|
| preservation stability (7 days) | | | | | | |
| Δ Vm | +3 | +2 | +1 | 0 | +2 | +1 |
| $t_5$ (min) | 7.5 | 7.5 | 7.3 | 7.1 | 7.4 | 7.1 |
| initial physical properties | | | | | | |
| $M_{100}$ (MPa) | 4.1 | 4.9 | 4.8 | 4.9 | 5.2 | 6.2 |
| $M_{300}$ (MPa) | 13.0 | 14.0 | 14.5 | 15.0 | 14.7 | 17.2 |
| Tb (MPa) | 16.5 | 17.2 | 17.3 | 17.4 | 17.2 | 18.1 |
| Eb (%) | 450 | 450 | 420 | 395 | 395 | 335 |
| Hs (JIS A) | 70 | 71 | 72 | 74 | 74 | 73 |
| compression set (%) | 48 | 46 | 46 | 42 | 42 | 33 |

TABLE 14

|  | Example 11 | Example 12 | Example 13 |
|---|---|---|---|
| Mooney scorch | | | |
| 125° C. Vm | 65.2 | 58.9 | 65.8 |
| $t_5$ (min) | 7.1 | 5.1 | 6.6 |
| Preservation stability (3 days) | | | |
| Δ Vm | −1 | 0 | +1 |
| $t_5$ (min) | 6.6 | 6.9 | 7.5 |
| initial physical properties | | | |
| $M_{100}$ (MPa) | 4.7 | 5.5 | 4.4 |
| $M_{300}$ (MPa) | 14.9 | 14.5 | 14.3 |
| Tb (MPa) | 17.9 | 15.3 | 17.4 |
| Eb (%) | 425 | 335 | 425 |
| Hs (JIS A) | 71 | 75 | 68 |
| compression set (%) | 43 | 35 | 40 |

TABLE 15

|  | Comparative Example 2 | Example 14 | Comparative Example 3 | Example 15 | Comparative Example 4 | Example 16 |
|---|---|---|---|---|---|---|
| Mooney scorch | | | | | | |
| 125° C. Vm | 60 | 45 | 64 | 54 | 62 | 54 |
| $t_5$ (min) | 8.5 | 13.1 | 7.8 | 14.4 | 8.4 | 11.9 |
| preservation stability (3 days) | | | | | | |
| Vm | 200< | 56 | 200< | 75 | 200< | 74 |
| Δ Vm (points) | | +11 | | +21 | | +20 |
| $t_5$ (min) | | 13.9 | | 30< | | 30< |
| initial physical properties | | | | | | |
| $M_{100}$ (MPa) | 5.7 | 3.4 | 4.4 | 3.8 | 4.6 | 4.2 |
| $M_{300}$ (MPa) | 14.9 | 10.3 | 13.7 | 11.5 | 13.4 | 12.7 |
| Tb (MPa) | 15.7 | 14.2 | 15.7 | 14.5 | 15.2 | 14.8 |
| Eb (%) | 325 | 500 | 365 | 420 | 365 | 390 |
| Hs (JIS A) | 71 | 69 | 74 | 74 | 75 | 75 |
| compression set (%) | 20 | 63 | 34 | 44 | 37 | 41 |

TABLE 16

|  | Example 17 | Example 18 | Example 19 | Example 20 | Example 21 | Example 22 | Example 23 | Example 24 |
|---|---|---|---|---|---|---|---|---|
| Mooney scorch | | | | | | | | |
| 125° C. Vm | 49 | 44 | 45 | 46 | 45 | 46 | 46 | 45 |
| $t_5$ (min) | 12.4 | 12.4 | 13.1 | 14.0 | 15.5 | 14.5 | 13.9 | 17.1 |

TABLE 16-continued

|  | Example 17 | Example 18 | Example 19 | Example 20 | Example 21 | Example 22 | Example 23 | Example 24 |
|---|---|---|---|---|---|---|---|---|
| preservation stability (3 days) |  |  |  |  |  |  |  |  |
| Vm | 60 | 65 | 66 | 61 | 64 | 65 | 67 | 62 |
| Δ Vm (points) | +11 | +21 | +21 | +15 | +19 | +19 | +21 | +17 |
| $t_5$ (min) | 20.1 | 6.6 | 10.2 | 8.4 | 8.8 | 8.7 | 15.1 | 24.4 |
| initial physical properties |  |  |  |  |  |  |  |  |
| $M_{100}$ (MPa) | 3.2 | 5.6 | 4.0 | 4.4 | 3.9 | 4.7 | 4.5 | 4.6 |
| $M_{300}$ (MPa) | 9.6 | 14.2 | 11.3 | 11.7 | 10.6 | 11.9 | 12.3 | 11.6 |
| Tb (MPa) | 13.9 | 15.8 | 14.5 | 14.6 | 14.2 | 13.6 | 15.3 | 14.2 |
| Eb (%) | 560 | 365 | 445 | 420 | 490 | 370 | 410 | 410 |
| Hs (JIS A | 67 | 72 | 69 | 75 | 72 | 73 | 74 | 74 |
| compression set (%) | 71 | 25 | 39 | 43 | 61 | 41 | 32 | 38 |

TABLE 17

|  | Comparative Example 5 | Example 25 | Example 26 | Example 27 | Example 28 | Example 29 | Example 30 |
|---|---|---|---|---|---|---|---|
| Mooney scorch |  |  |  |  |  |  |  |
| 125° C. Vm | 31 | 26 | 23 | 32 | 26 | 29 | 31 |
| $t_5$ (min) | 11.2 | 21.5 | 18.5 | 15.9 | 18.9 | 15.6 | 9.5 |
| preservation stability (3 days) |  |  |  |  |  |  |  |
| Vm | 62 | 30 | 27 | 39 | 33 | 37 | 47 |
| Δ Vm (points) | +31 | +4 | +4 | +7 | +7 | +8 | +16 |
| $t_5$ (min) | 4.5 | 10.4 | 10.8 | 10.6 | 10.5 | 7.0 | 6.2 |
| initial physical properties |  |  |  |  |  |  |  |
| $M_{100}$ (MPa) | 2.9 | 2.9 | 3.3 | 2.0 | 1.0 | 2.9 | 2.5 |
| $M_{300}$ (MPa) | 3.7 | 3.5 | 3.9 | 3.6 | 1.8 | 3.8 | 4.3 |
| Tb (MPa) | 12.8 | 6.6 | 10.8 | 10.5 | 9.1 | 10.5 | 13.4 |
| Eb (%) | 700 | 710 | 710 | 575 | 505 | 640 | 565 |
| Hs (JIS A | 70 | 62 | 69 | 63 | 57 | 68 | 67 |
| compression set (%) | 48 | 38 | 71 | 52 | 46 | 68 | 48 |

TABLE 18

|  | Comparative Example 6 | Example 31 |
|---|---|---|
| Mooney scorch |  |  |
| 125° C. Vm | 51 | 48 |
| $t_5$ (min) | 10.0 | 14.5 |
| preservation stability (3 days) |  |  |
| Vm | 200< | 72 |
| Δ Vm (points) | — | +24 |
| $t_5$ (min) | — | 5.8 |
| initial physical properties |  |  |
| $M_{100}$ (MPa) | 2.6 | 1.5 |
| $M_{300}$ (MPa) | 6.6 | 3.3 |
| Tb (MPa) | 12.7 | 8.1 |
| Eb (%) | 860 | 955 |
| Hs (JIS A | 67 | 65 |
| compression set (%) | 66 | 85 |

TABLE 19

|  | Example 32 | Example 33 | Example 34 | Example 35 |
|---|---|---|---|---|
| Mooney scorch |  |  |  |  |
| 125° C. Vm | 26 | 28 | 27 | 17 |
| $t_5$ (min) | 14.2 | 10.0 | 18.6 | 14.0 |
| preservation stability (3 days) |  |  |  |  |
| Vm | 27 | 38 | 38 | 24 |
| Δ Vm (points) | +1 | +10 | +11 | +7 |
| $t_5$ (min) | 7.5 | 7.5 | 6.8 | 6.4 |

TABLE 19-continued

|  | Example 32 | Example 33 | Example 34 | Example 35 |
|---|---|---|---|---|
| initial physical properties | | | | |
| $M_{100}$ (MPa) | 3.6 | 2.4 | 2.7 | 2.2 |
| $M_{300}$ (MPa) | 5.0 | 2.7 | 3.0 | 2.5 |
| Tb (MPa) | 9.8 | 11.3 | 11.1 | 7.8 |
| Eb (%) | 475 | 825 | 795 | 875 |
| Hs (JIS A) | 69 | 63 | 66 | 64 |
| compression set (%) | 37 | 45 | 59 | 43 |
| Peeling from NBR/PVC | | | | |
| peel strength (kg/cm) | 2.6 | 2.5 | 3.5 | 2.4 |
| peeled state | CPE destruction | CPE destruction | CPE destruction | CPE destruction |
| Peeling from ECO | | | | |
| peel strength (kg/cm) | 2.5 | 2.3 | 3.4 | 2.5 |
| peeled state | CPE destruction | CPE destruction | CPE destruction | CPE destruction |

TABLE 20

|  | Comparative Example 7 | Example 36 | Example 37 | Comparative Example 8 | Example 38 |
|---|---|---|---|---|---|
| Mooney scorch | | | | | |
| 125° C. Vm | 24.4 | 18 | 17 | 11.7 | 10 |
| $t_5$ (min) | 12.5 | 30< | 30< | 24.2 | 30< |
| preservation stability (3 days) | | | | | |
| Vm | 43.2 | 19 | 17.3 | 19.2 | 10.8 |
| Δ Vm (points) | +19 | +1 | 0 | +7 | +1 |
| $t_5$ (min) | 5.5 | 27.6 | 16.8 | 7.2 | 24.8 |
| initial physical properties | | | | | |
| $M_{100}$ (MPa) | 4.5 | 2.8 | 4.2 | 4.8 | 2.5 |
| $M_{300}$ (MPa) | 15.2 | 11 | 15.7 | 5.9 | 3.5 |
| Tb (MPa) | 17.5 | 14.6 | 17.1 | 13.6 | 14.6 |
| Eb (%) | 345 | 475 | 350 | 685 | 765 |
| Hs (JIS A) | 67 | 66 | 70 | 67 | 61 |
| compression set (%) | 82 | 84 | 74 | 88 | 88 |

TABLE 21

|  | Comparative Example 9 | Example 39 | Example 40 | Example 41 |
|---|---|---|---|---|
| Mooney scorch | | | | |
| 125° C. Vm | 38 | 40 | 39 | 41 |
| $t_5$ (min) | 24.0 | 18.0 | 12.8 | 44.0 |
| preservation stability (3 days) | | | | |
| Vm | 52 | 38 | 44 | 37 |
| Δ Vm (points) | +14 | −2 | +5 | −4 |
| $t_5$ (min) | 9.8 | 15.3 | 8.6 | 24.0 |
| initial physical properties | | | | |
| $M_{100}$ (MPa) | 3.0 | 1.5 | 2.0 | 1.3 |
| $M_{300}$ (MPa) | 7.5 | 3.8 | 5.1 | 2.9 |
| Tb (MPa) | 11.6 | 10.5 | 11.6 | 6.6 |
| Eb (%) | 615 | 955 | 845 | 710 |
| Hs (JIS A) | 67 | 60 | 63 | 67 |
| compression set (%) | 44 | 67 | 54 | 83 |

In the above Tables, $t_5$ represents a Mooney Scorch time as defined in the Mooney Scorch test of JIS K6300; $M_{100}$ represents a tensile stress at 100% elongation as defined in the tensile test of JIS K6251; $M_{300}$ represents a tensile stress at 300% elongation as defined in the tensile test of JIS K6251; $T_b$ represents a tensile strength as defined in the tensile test of JIS K6251; $E_b$ represents an elongation as defined in the tensile test of JIS K6251; $H_s$ represents a hardness as defined in the hardness test of JIS K6253; and the "compression set" represents a compression set ratio (%) as defined in the compression set test of JIS K6262, where the compression ratio is 25%, the heat treating temperature is 100° C., and the heat treating time is 72 hours. In the Tables 18 and 21, the heat treating temperature is 125° C.

As understood from the above Tables, the preservation stability of the vulcanizing composition increased greatly by blending a zeolite compound as an acid receiving agent.

In Examples 5 to 8, in which all the blending materials except the vulcanizing agent (b) and the organic vulcanization accelerator (c) are kneaded at the same time, the preservation stability is kept good and the vulcanization physical properties, especially $M_{100}$, and the compression set are further improved with the rise of the kneading temperature.

In Examples 9 and 10 using an activated synthetic zeolite, the preservation stability is kept good and the vulcanization physical properties, especially $M_{100}$, and the compression set are further improved with the rise of the kneading temperature.

The vulcanizing compositions of Comparative Examples 2 to 4 using conventionally known MgO have a very poor preservation stability whereas the vulcanizing compositions of Examples 14 to 16 containing a synthetic zeolite as an acid receiving agent have an excellent preservation stability.

In Examples 17 to 24, the vulcanization speed increases and, particularly the compression set property is greatly improved by adding an inorganic vulcanization accelerator. In Examples 18 to 24, even a very small amount of addition of an inorganic vulcanization accelerator brings about the advantageous effect.

Examples 25 to 30 are those using a white filler or an inorganic vulcanization accelerator. In Comparative Example 5 the preservation stability is poor whereas in Example 25 using a synthetic zeolite, the preservation stability is very good. Examples 26 to 30 using a white filler or an inorganic vulcanization accelerator exhibit a good preservation stability.

In Examples 32 to 35 a vulcanized laminated product having a large peeling strength is obtained. Since the scorching time is sufficiently long and the preservation stability is good, a hose made of this vulcanized laminated product has a large peeling strength and can be molded by extrusion without troubles.

A good preservation stability was exhibited also in Examples 31, 39, 40, and 41, where epichlorohydrin rubber was used as the chlorine-containing polymer, and in Examples 36 to 38, where chlorosulfonated polyethylene was used as the chlorine-containing polymer.

According to the present invention, the preservation stability of a chlorine-containing polymer vulcanizing composition can be greatly improved by incorporating blending a zeolite compound as an acid receiving agent.

In addition, the preservation stability is kept good and the vulcanization physical properties are further improved with the rise of the kneading temperature by using an activated zeolite compound as a zeolite compound.

What is claimed is:

1. A chlorine-containing polymer vulcanizing composition obtained by blending (a) a zeolite composition; (b) a vulcanizing agent selected from the group consisting of a 2,3-dimercaptoquinoxaline derivative, a thiourea compound, and a thiuram compound: and (c) an organic vulcanization accelerator; with a chlorine-containing polymer, wherein said chlorine-containing polymer is a polymer selected from the group consisting of chlorinated polyethylene, epichlorohydnn polymer, polyvinyl chloride, chloroprene rubber, chlorinated natural rubber, chlorosulfonated polyethylene, chlorinated butyl rubber, and acrylic rubber copolymerized with a chlorine-containing monomer, or a mixture thereof, and wherein said organic vulcanization accelerator is a compound selected from the group consisting of a primary amine, a secondary amine, a tertiary amine, an organic acid salt or adduct of said amine, an aldehyde ammonia compound, an aldehyde amine compound, a guanidine compound, a thiazole compound, a sulfeneamide compound, a thiuram compound, a dithocarbamic acid compound, 1,8-diazabicvclo(5,4,0)undecene-7, and a weak acid salt thereof, and a quaternary ammonium salt compound, or a mixture thereof.

2. A chlorine-containing polymer vulcanizing composition according to claim 1, wherein said chlorine-containing polymer is a blend of a chlorine-containing polymer in a major proportion and another rubber and/or resin in a minor proportion.

3. A chlorine-containing polymer vulcanizing composition according to claim 1, wherein said zeolite compound is a polymer selected from the group consisting of natural zeolite, an A-type synthetic zeolite, X-type synthetic zeolite, Y-type synthetic zeolite, a sodalite, natural or synthetic mordenite, ZSM-5, and a metal substitution product thereof, or a mixture thereof.

4. A chlorine-containing polymer vulcanizing composition according to claim 3, wherein said zeolite compound is an activated zeolite compound.

5. A chlorine-containing polymer vulcanizing composition according to claim 1, wherein (a) 0.5 to 30 parts by weight of said zeolite compound, (b) 0.1 to 5 parts by weight of said vulcanizing agent, and (c) 0.5 to 3 mol of said organic vulcanization accelerator with respect to 1 mol of (b) said vulcanizing agent are blended with 100 parts by weight of chlorinated polyethylene.

6. A chlorine-containing polymer vulcanizing composition according to claim 1, wherein (a) 0.5 to 30 parts by weight of said zeolite compound, (b) 0.1 to 5 parts by weight of said vulcanizing agent, and (c) 0.5 to 3 mole of said organic vulcanization accelerator with respect to 1 mol of (b) said vulcanizing agent are blended with 100 parts by weight of an epichlorohydrin polymer.

7. A chlorine-containing polymer vulcanizing composition according to claim 1, wherein (a) 0.5 to 30 parts by weight of said zeolite compound, (b) 0.1 to 5 parts by weight of said vulcanizing agent, and (c) 0.5 to 3 mol of said organic vulcanization accelerator with respect to 1 mol of (b) said vulcanizing agent are blended with 100 parts by weight of chlorosulfonated polyethylene.

8. A chlorine-containing polymer vulcanizing composition according to claim 1, wherein (a) 0.5 to 30 parts by weight of said zeolite compound, (b) 0.1 to 5 parts by weight of said vulcanizing agent, (c) 0.5 to 3 mol of said organic vulcanization accelerator with respect to 1 mol of said vulcanizing agent, and further (d) 0 to 20 parts by weight of an inorganic vulcanization accelerator are blended with 100 parts by weight of a chlorine-containing polymer.

9. A chlorine-containing polymer vulcanizing composition according to claim 8, wherein said inorganic vulcanization accelerator is a compound selected from the group consisting of a basic metal oxide, a basic metal salt, a basic metal hydroxide, a basic silicon dioxide, a silicate, and a hydrotalcite.

10. A chlorine-containing polymer vulcanizing composition according to claim 8, wherein said inorganic vulcanization accelerator is a basic metal carbonate, and said chlorine-containing polymer is chlorinated polyethylene or an epichlorohydrin polymer.

11. A chlorine-containing polymer vulcanized product obtained by vulcanizing a chlorine-containing polymer vulcanizing composition according to claim 1.

12. A laminated product comprising a layer of epichlorohydrin rubber, nitrile rubber, nitrile rubber containing polyvinyl chloride blended therewith, or acrylic rubber, and a layer of a chlorine-containing polymer vulcanized product according to claim 11.

13. A laminated hose comprising an inner layer of epichlorohydrin rubber, nitrile rubber, nitrile rubber containing polyvinyl chloride blended therewith, or acrylic rubber, and an outer layer of a chlorine-containing polymer vulcanized product according to claim 11.

14. A chlorine-containing polymer vulcanizing composition consisting of:

a zeolite compound;

a vulcanizing agent selected from the group consisting of a 2,3-dimercaptoquinoxaline derivative, a thiourea compound, and a thiuram compound;

an organic vulcanization accelerator selected from the group consisting of a primary amine, a secondary amine, a tertiary amine, an organic acid salt or adduct of said amine, an aldehyde ammonia compound, an aldehyde amine compound, a guanidine compound, a thiazole compound, a sulfeneamide compound, a thiuram compound, a dithocarbamic acid compound, 1,8-diazabicyclo(5,4,0)undecene-7, and a weak acid salt thereof, and a quaternary ammonium salt compound, or a mixture thereof; and a chlorine-containing polymer selected from the group consisting of chlorinated polyethylene, epichlorohydrin polymer, polyvinyl chloride, chloroprene rubber, chlorinated natural rubber, chlorosulfonated polyethylene, chlorinated butyl rubber, and acrylic rubber copolymerized with a chlorine-containing monomer, or a mixture thereof.

* * * * *